Sept. 25, 1956  W. J. MEYER  2,764,299
CUSHIONED UNDERFRAME
Filed May 22, 1952  8 Sheets-Sheet 1
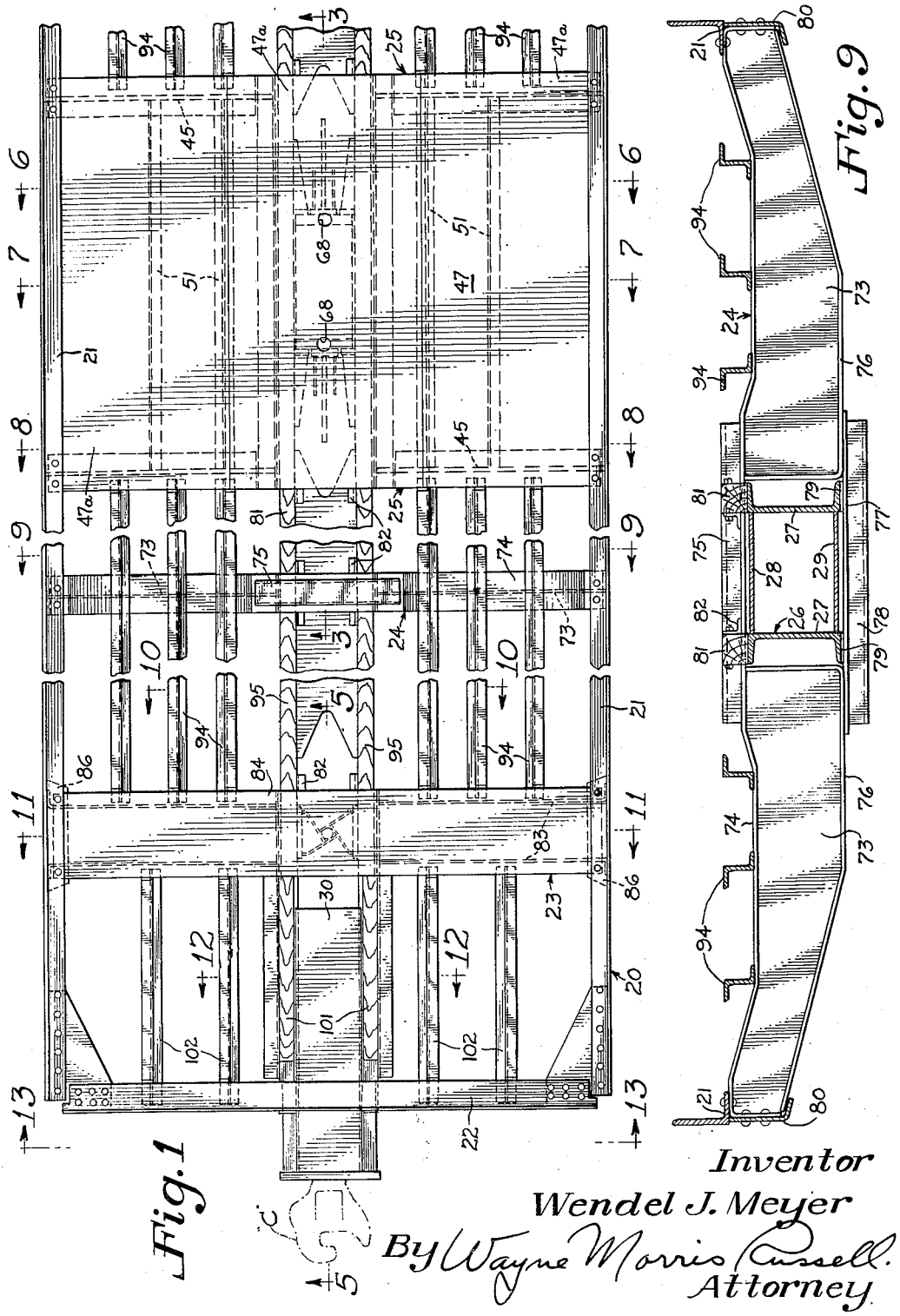
Inventor
Wendel J. Meyer
By Wayne Morris Russell
Attorney

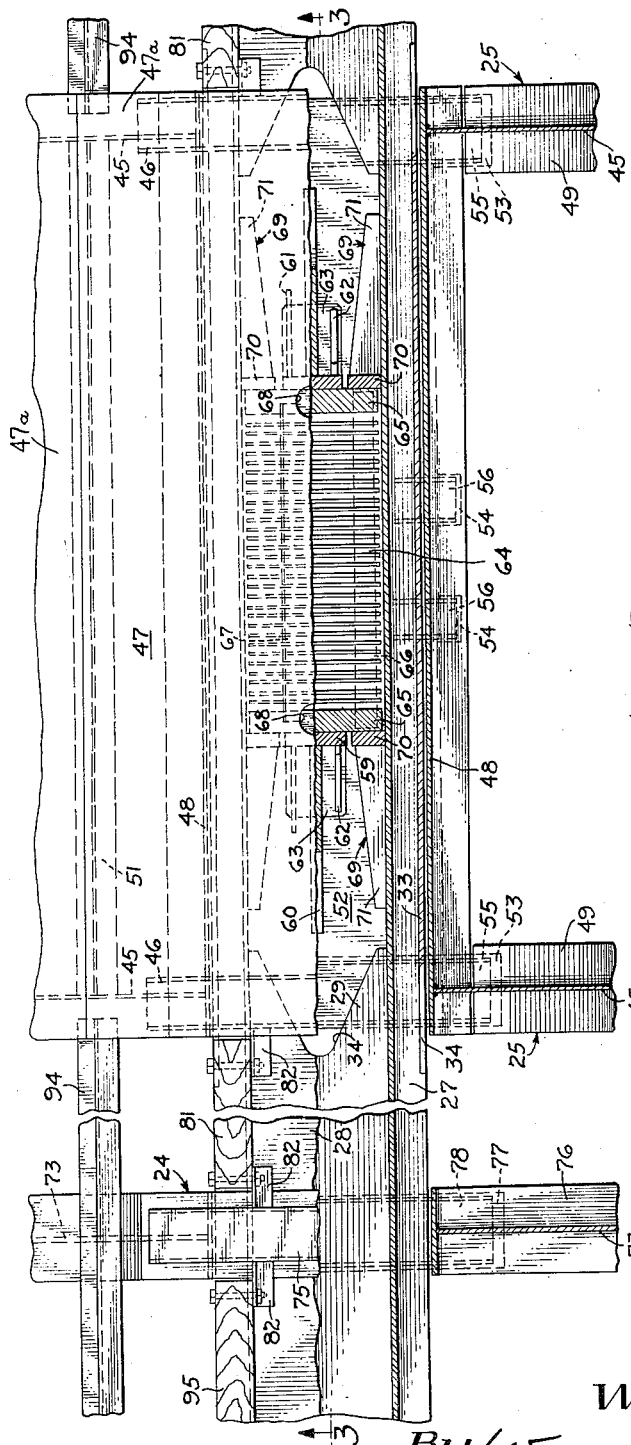

Sept. 25, 1956  W. J. MEYER  2,764,299
CUSHIONED UNDERFRAME
Filed May 22, 1952  8 Sheets-Sheet 3

Inventor
Wendel J. Meyer
By Wayne Morris Russell
Attorney

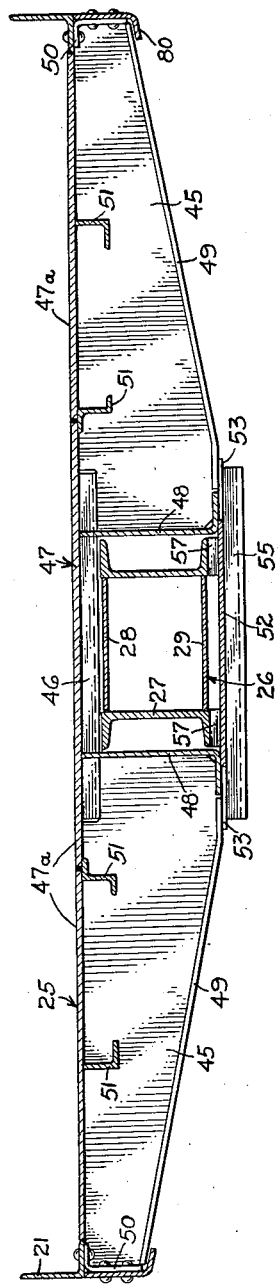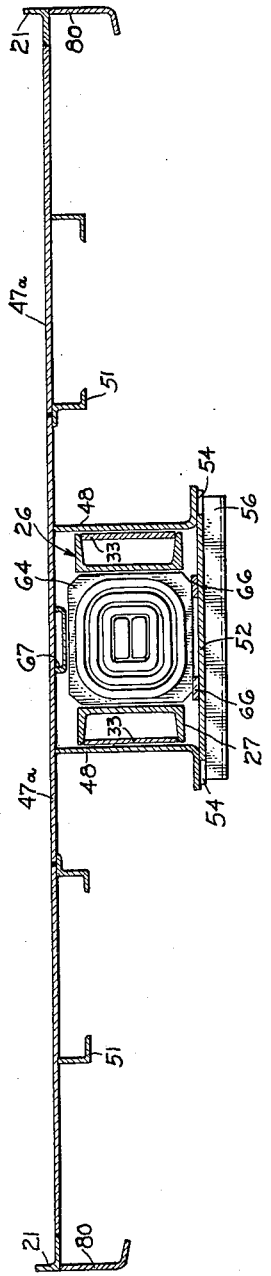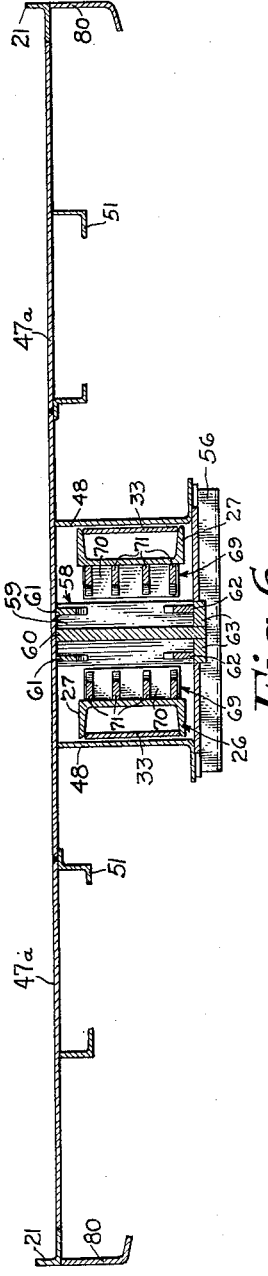

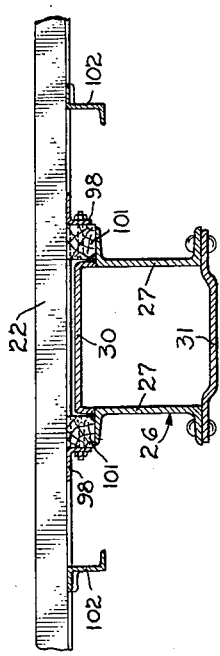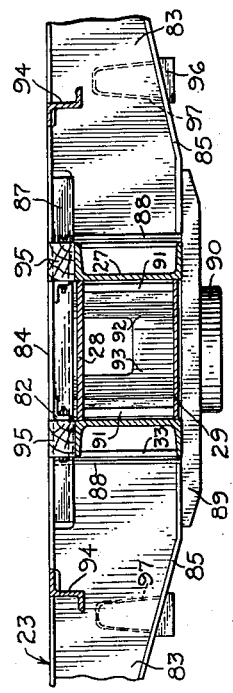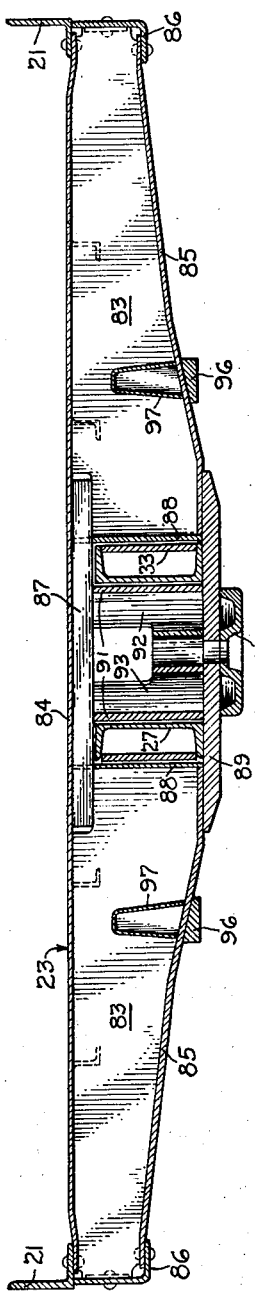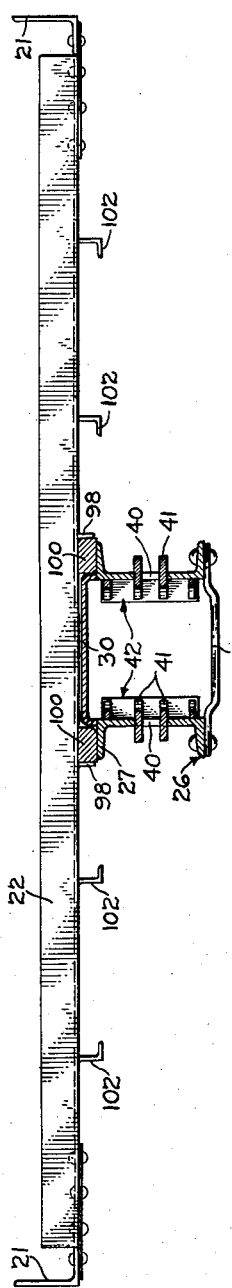

Inventor
Wendel J. Meyer
By Wayne Morris Russell
Attorney

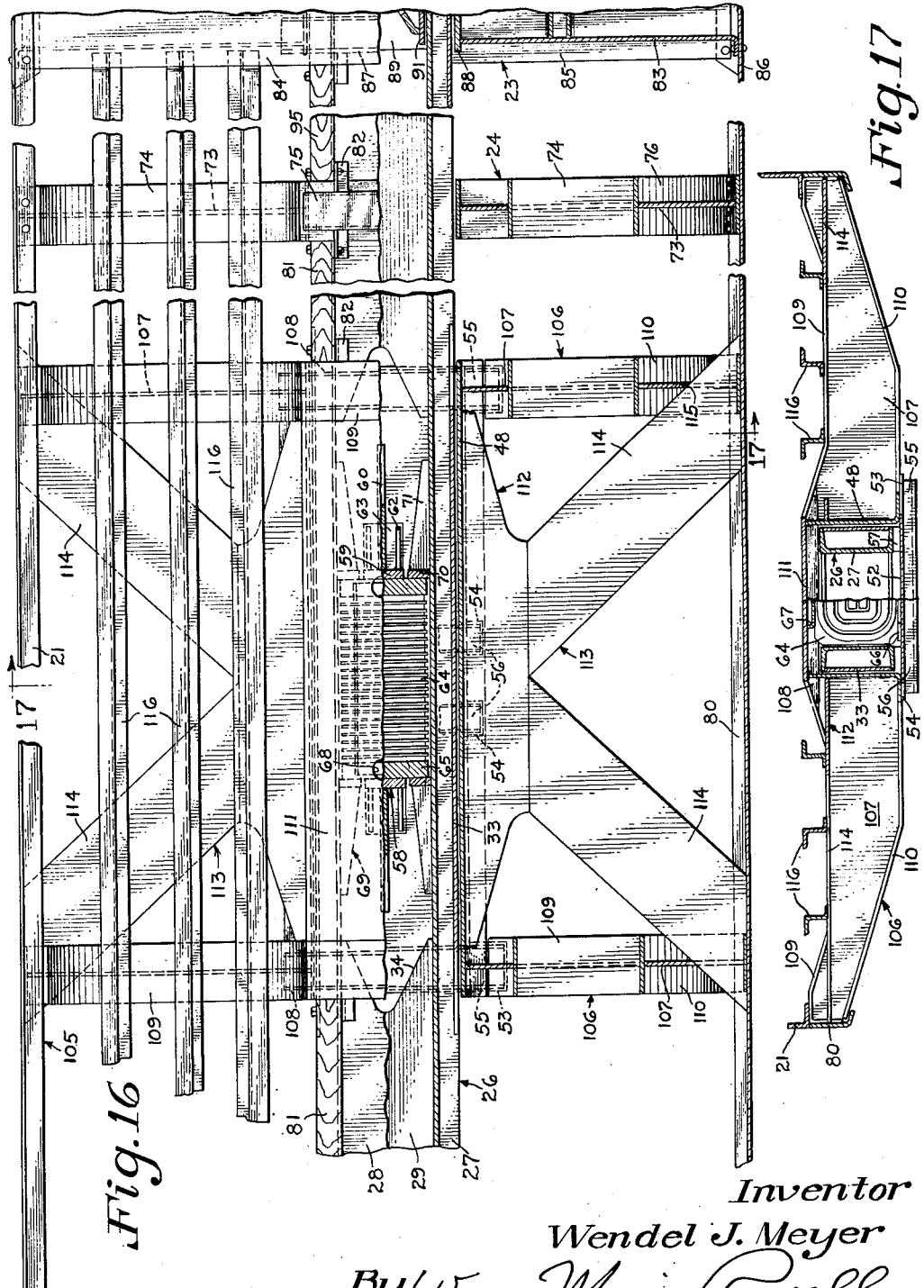

United States Patent Office 2,764,299
Patented Sept. 25, 1956

2,764,299

CUSHIONED UNDERFRAME

Wendel J. Meyer, Evanston, Ill., assignor to Pullman-Standard Car Manufacturing Company, Chicago, Ill., a corporation of Delaware Application May 22, 1952, Serial No. 289,395

20 Claims. (Cl. 213—8)

The present invention relates to a railway car cushion underframe, and more particularly to such an underframe in which means are provided for distributing over an extended portion thereof the stresses resulting from imposition of draft or buffing forces on the center sill.

Railway car cushion underframes with center sills longitudinally slidable relative to the remainder of the underframe having resilient means disposed between the sill and car structure to cushion the transmission of impacts from the center sill to the remainder of the car have been known for some years. Such constructions have been of limited effectiveness because the transmission of impacts from the center sill is effected at certain points on the structure, and the resulting shocks, even though reduced by the cushioning effect of the resilient means, are concentrated at such points and transmitted directly to the underframe. The destructive effects of draft and buff forces is thus only partially avoided. The present invention provides for the distribution and dissipation of the impact forces over an extended area or portion of the underframe, or in other words for receiving the center sill impact and spreading the stresses so that the force imposed on the underframe at any one point is relatively slight, and the effects of the impact on the underframe therefore minimized.

The invention is disclosed as embodied in a structure including a plate member which is secured at its edges to the underframe, specifically the side sills and the crossbearers at the central portion of the car, and acts as the only element receiving the center sill impacts, cushioning means being disposed between this structure and the center sill. In one illustrated embodiment, the plate member is of generally rectangular shape connected at its side edges to the side sills and serving as the top cover plate for a pair of spaced cross-bearers adjacent the center of the underframe. The plate overlies the center sill and has rigidly secured thereto pocket-forming means in which resilient cushioning means are carried under partial compression in position to be further compressed by suitable center sill projections upon relative movement of the center sill under impact. The plate member, crossbearers, and pocket for the resilient means may be assembled as a unit for incorporation in the underframe. The plate reinforces and rigidifies the car floor at the central portion thereof, which is the portion most subjected to strain and wear.

In another embodiment illustrated, the plate member is generally of X shape with the ends of its arms connected to the side sills and crossbearers, serving as a truss member to transmit center sill impacts in both compression and tension in either direction of movement of the center sill. The truss plate is disposed substantially in the plane of the center sill, and is provided with a pocket for the cushioning means similar to that of the plate of the first-mentioned form.

It is an object of the invention to provide means for minimizing the stresses imposed on railway cars and lading or passengers carried thereby by impacts on the center sill, primarily in draft and buff.

It is another object of the invention to provide means for distributing over an extended portion of a railway car underframe the stresses arising from forces acting longitudinally on the center sill thereof.

Another object is the provision of a railway car cushion underframe including a slidable center sill and resilient means arranged between the sill and the remainder of the underframe to cushion the transmission of impacts therebetween, in which a force-distributing structure carrying the resilient means is arranged to spread over an extended portion of the underframe forces produced by impacts beyond the cushioning capacity of the resilient means, so as to minimize the shocks and stresses arising therefrom.

Another object is the provision of a railway car cushion underframe including a slidable center sill and resilient means disposed between the sill and the remainder of the underframe to cushion the transmission of impacts therebetween in which cooperating lug means on the sill and underframe act upon the resilient means and provide therewith the only means for impact-transmitting engagement therebetween.

A further object is the provision of a railway car cushion underframe having a slidable center sill in which cushioning means are provided between the sill and a plate extending between the side sills and serving to distribute over an extended portion of the underframe impacts on the center sill transmitted through the cushioning means, so as to minimize the resulting stresses on the underframe.

It is another object of the invention to provide a railway car cushion underframe having a slidable center sill in which a plate is disposed over the central portion of the underframe to reinforce the most stressed portion of the car floor and to receive from the center sill and distribute over an extended portion of the underframe stresses arising from impact forces on the center sill so as to minimize the effect thereof.

Another object is to provide a cushion underframe having a slidable center sill in which a truss member is disposed to receive the stresses arising from impact forces on the center sill and transmit the same to the remainder of the underframe over an extended portion thereof so as to minimize the effect of such stresses.

Another object of the invention is to provide a cushion underframe having a slidable center sill, in which there is incorporated a unitary cushioning assembly of crossbearers, a plate connecting the crossbearers and extending the full length thereof for connection to the side sills, and cushioning means carried by the plate for engagement by the center sill.

Another object is to provide a cushioned underframe having a slidable center sill, in which there is incorporated a unitary cushioning assembly of cross-bearers, plate means connecting the crossbearers and extending the full distance therebetween and also extending laterally for connection to the side sills, and cushioning means carried by the plate means for engagement by the center sill.

Other and further objects, advantages, and features of the invention will be apparent to those skilled in the art from the following description and the accompanying drawings in which:

Fig. 1 is a fragmentary plan view of a portion of a railway car underframe, including one end thereof, incorporating the invention;

Fig. 2 is a fragmentary enlarged view, partly in section and with parts broken away, of a central portion of the underframe;

Fig. 3 is a vertical sectional view taken substantially as indicated by the line 3—3 in each of Figs. 1 and 2;

Figure 14:
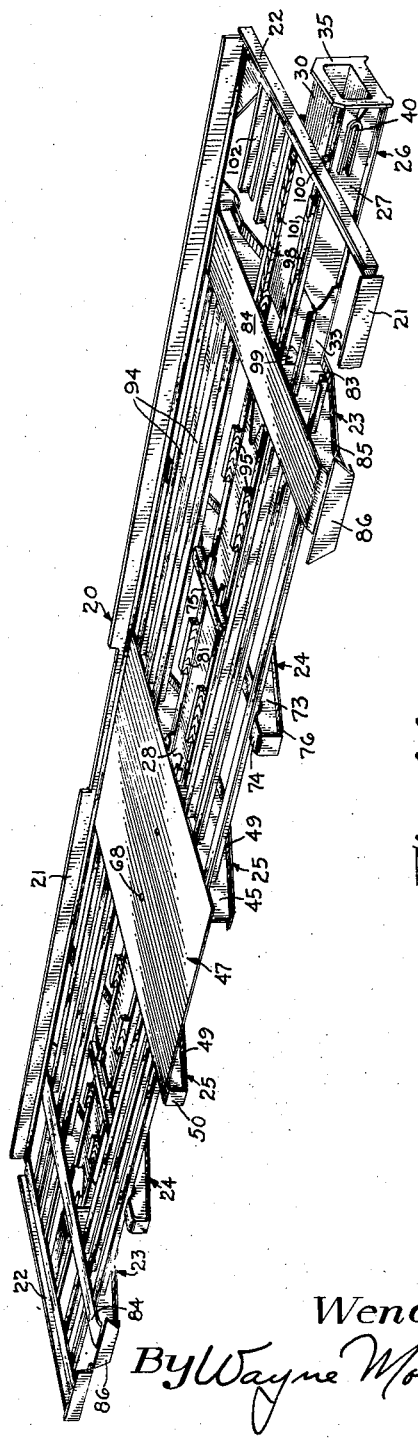
Figure 15:
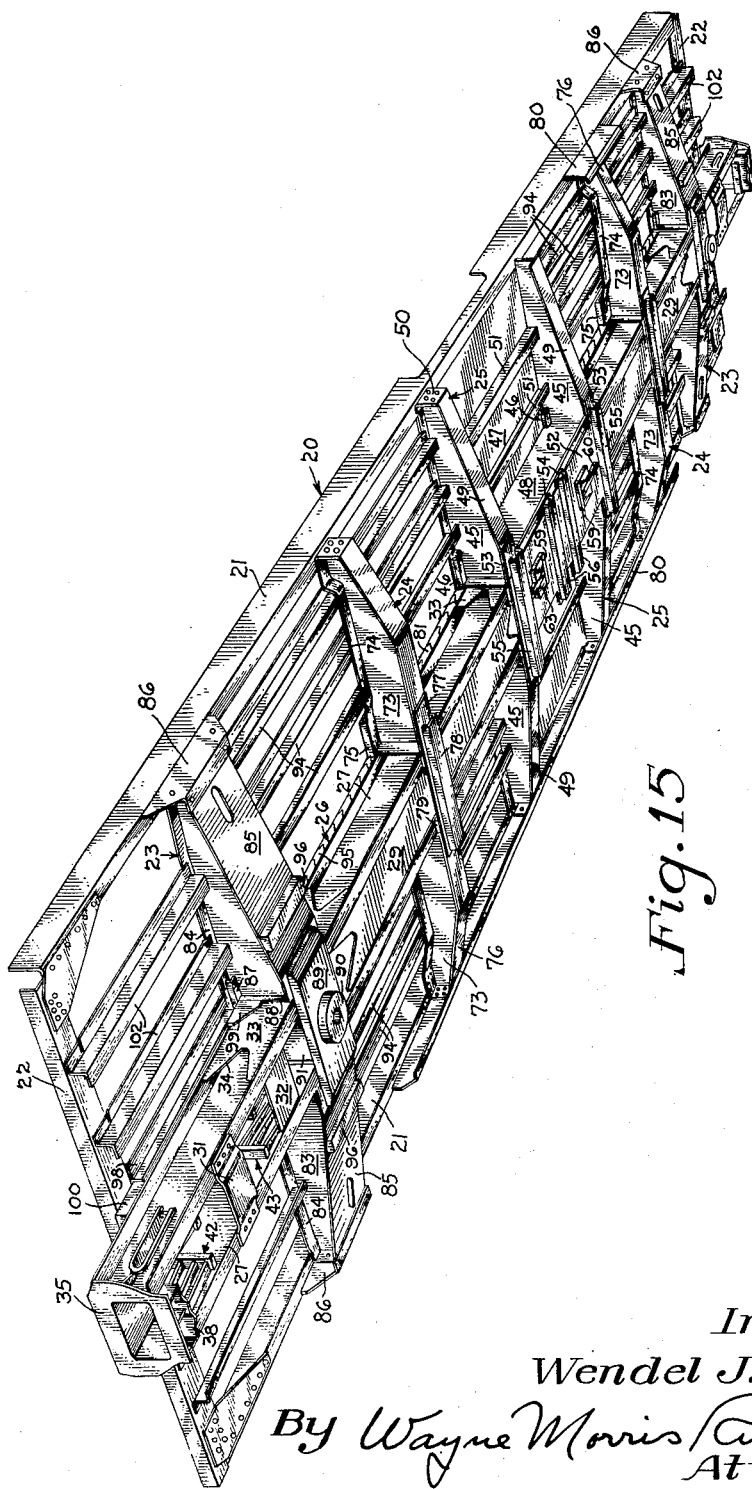

Figs. 6 to 13 inclusive are enlarged transverse sectional views through the underframe taken substantially as indicated by lines 6—6 to 13—13 inclusive, respectively, of Fig. 1;

Fig. 14 is a top perspective view of the underframe with certain parts broken away or omitted;

Fig. 15 is a bottom perspective view of the underframe with a part broken away;

Fig. 16 is a fragmentary plan view similar to Fig. 2 but illustrating another embodiment of the invention; and Fig. 17 is a transverse sectional view taken substantially as indicated by the line 17—17 of Fig. 16.

Referring first to the embodiment shown in Figs. 1 to 15, there is shown an underframe 20 having a pair of side sills 21 connected by end sills 22 and supported on the ends of body bolsters 23, intermediate crossbearers 24, and central crossbearers 25, in which a center sill 26 is mounted for relative longitudinal sliding movement. The sill 26 might more accurately be termed a buffing column, but is designated a sliding center sill in accordance with prevailing terminology in the art. In the present instance, two crossbearers 25 are employed, located at the central portion of the underframe, and two crossbearers 24 each located between one of the central crossbearers and a bolster 23. It may be noted that the designation of the crossbearers 24 and 25 as "intermediate" and "central" is arbitrary and for convenience in description only, since the crossbearers 25 are intermediate the bolsters 23 and the intermediate crossbearers 24. The side and end sills are in the form of angle members disposed with one flange vertical and the other extending inwardly from the bottom of the first.

Figure 4:
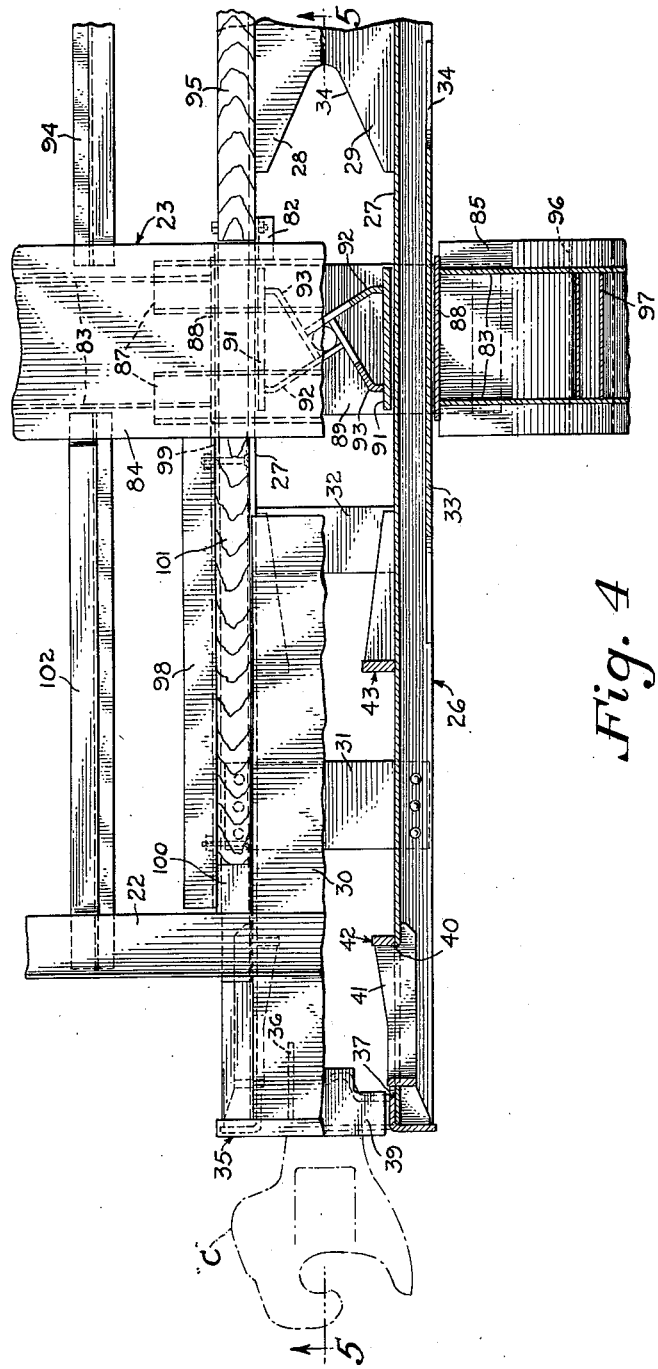
Fig. 4 is an enlarged fragmentary plan view, partly in section and with parts broken away, of an end portion of the underframe.
Figure 5:
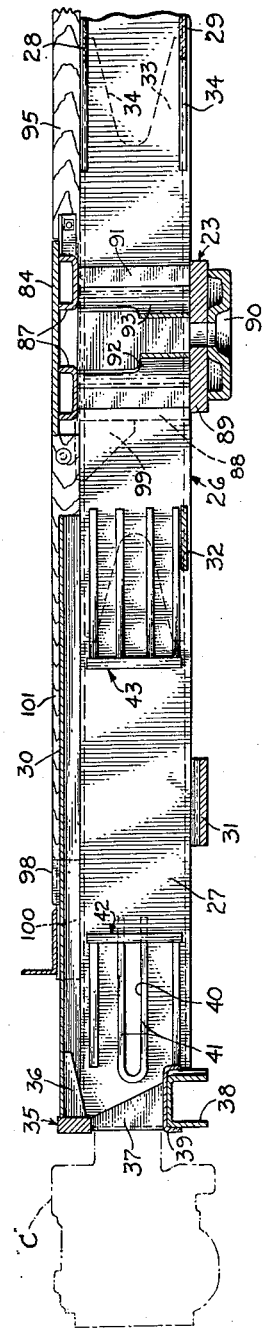
Fig. 5 is a vertical sectional view taken substantially as indicated by the line 5—5 in each of Figs. 1 and 4.

The center sill 26 is formed of a pair of parallel channel members 27 arranged with their webs vertical and their flanges extending laterally outwardly, and connected by substantially identical top and bottom cover plates 28 and 29, respectively, welded between the channel member webs. The plates 28 and 29 are arranged in two pairs each consisting of a top and a bottom plate in registering but vertically spaced relation, the pairs being spaced longitudinally outwardly of the middle of the center sill so that each extends through one of the intermediate crossbearers 24 with the ends of the plates spaced from the adjacent bolster and crossbearer 25. The channel members 27 are also connected adjacent each end of the center sill by a draft gear pocket cover 30 of inverted channel form having its flanges welded to the upper surfaces of the members 27, as best shown in Figs. 5 and 13, by a conventional draft gear carrier 31 riveted to the lower flanges of the channel members, and a tie plate 32 welded to the channel member webs below the inner end of the pocket cover 30. The inner ends of the covers 30 are spaced outwardly of the respective bolsters 23 and of the outer ends of the top and bottom plates 28 and 29. Longitudinal reinforcements 33 are disposed at the outer sides of the center sill 26 extending along the portions thereof not covered by the plates 28 and pocket covers 30. The reinforcements 33 are arranged parallel to the webs of the channel members 27 and welded to the flange edges, being of a width or height appropriate for this purpose and of a length such as to project beyond the ends of the plates 28 and 29 and covers 30. The ends of the top and bottom plates and reinforcements are formed each with a V-shaped notch 34 proportioned to give substantially uniform strength at the overlaps or areas of transition between horizontal and vertical reinforcement of the center sill channel members. By the arrangement of top and bottom cover plates and reinforcements disclosed, the center sill is given substantially uniform strength throughout its length while being formed to slide relative to the remainder of the underframe 20 without interference throughout its designed maximum travel. To this same end, since the sill is wider than it is high, the reinforcements 33 are somewhat thicker than the plates 28 and 29 to compensate for the difference. At each end, as best shown in Figs. 4 and 5, the center sill has applied thereto a striker 35 which includes face ribs 36 and side ribs 37, as well as a coupler carrier 38 over which is disposed a wear plate 39 for supporting a conventional coupler C, shown in phantom in Figs. 1, 4, and 5. The strikers serve to connect and reinforce the ends of the channel members 27, in addition to protecting the center sill against blows by the coupler horn. Just inwardly of each striker, the web of each channel member is provided with a draft gear key slot 40 the upper and lower edges of which are extended laterally both inwardly and outwardly by suitable ribs 41, of which the inner ribs with additional ribs above and below on the inner face of the web and a vertical face portion at the inner end of the slot provide a front draft gear lug 42. A similar but opposed rear draft gear lug 43 is provided on the inner face of each channel member, having ribs extending longitudinally inwardly to substantially the inner end of the pocket cover 30 and tie plate 32. The draft gear carrier 31 is disposed substantially midway between the lugs 42 and 43. A conventional draft gear (not shown) of any suitable type may be disposed in the center sill between the front and rear lugs and connected to the coupler C in the usual way to cushion shocks due to overcoming the inertia of the center sill when it is put in motion by draft or buffing forces.

The central crossbearers 25 each comprise a vertical diaphragm provided by a pair of webs 45 each extending from one of the side sills 21 to the central portion of the crossbearer, with their inner ends spaced apart by somewhat more than the width of the center sill 26. The upper edges of the webs are in a horizontal plane just below the side sills, except that they are cut away slightly at the outer ends and more extensively at the inner ends of the webs. A channel member 46 accommodated by the cut outs at the inner ends bridges the space between the webs and rigidly connects them, the channel member being welded to the webs 45 with its flanges turned upwardly and terminating in the plane of the upper edges of the webs. A substantially rectangular stress-distributing plate member 47 of a size corresponding to the rectangle defined by the side sills and crossbearers 25 is disposed over the crossbearers and between the side sills and welded to the upper edges of the webs 45 and channel member 46 and to the edges of the horizontal side sill flanges. The plate member 47 lies in the plane of the side sill flanges and serves as the top cover plates for both crossbearers and connects them as a unit, providing a strong reinforced structure at the center of the underframe. The primary function of the plate member, however, is to distribute over an extended portion of the underframe the stresses arising from draft or buff impacts on the center sill, as more fully explained herebelow. The plate member 47 may take the form of a single plate or a plurality of smaller plates, such as the three plates 47a, welded together along adjacent edges. Cushion gear sills in the form of angle plates 48 having a vertical portion welded to the inner ends of the webs 45 and a horizontal flange welded to the lower web edges extend between and through the crossbearers 25 below the plate member with their upper edges welded thereto, providing a channel in which the center sill 26 is received. Bottom cover plates 49 are welded to the bottom edges of the webs 45, extending from the outer web ends to the edges of the angle plate flanges. At the ends of the crossbearers are welded suitable angle members 50 with vertical flanges abutted by the web end edges and horizontal flanges disposed in the upper web edge cutaway portions under the side sills 21, which are riveted to the members 50 for connection to the crossbearers. A plurality of longitudinal stringers 51 are welded to the lower surface of plate member 47, extending between crossbearers 25 with their ends welded to the webs 45. In this case two stringers are employed at each side of the center sill, one being a Z-bar having a flange serving as a butt strap for the joint between the central and outer plates 47a.

A supporting plate 52 parallel to the plate member 47 and like it and the cushion gear sills or angle plates 48 extending the full distance between the crossbearers 25 is welded to the lower faces of the angle plate flanges and bottom plates 49, its end portions serving as tie plates between the inner ends of the webs 45 and connecting the bottom plates. The plate 52 closes the bottom of the channel defined by the angle plates and plate member 47 and forms therewith a pocket for resilient cushioning means hereafter described. The retaining plate has at each end side extensions 53, and two longitudinally spaced pairs of similar extensions 54 at its central portion. A reinforcing channel member 55 disposed in the vertical plane of the alined webs 45 of each crossbearer is welded to the supporting plate 52 and extensions 53 at each end, and in combination with the upper channel member 46 resists the bending moment due to vertical shear which tends to distort the opening for the sliding center sill. A pair of channel members 56 are welded to the plate 52 and extensions 54 to reinforce the central portion of the plate. A pair of wear plates 57 slidably supporting the center sill 26 are welded to the upper surface of the supporting plate, the bottom flanges of the sill channel members 27 bearing on these wear plates. The supporting plate 52 with the extensions 53 and 54 may be welded with the channel members 55 and 56 and wear plates 57 to provide a sub-assembly which is readily applied to the underframe and welded in place as a unit. Depending from the stress-distributing plate member 47 into the space between the channel members 27 of the center sill is a pair of opposed abutments generally designated 58 equidistantly spaced longitudinally from the center of the plate member, centered on the longitudinal midline of the sill 26 and having a width less than the interior width of the sill. Each of these abutments 58 comprises a vertical stop 59 in the form of a heavy plate centrally braced for its entire height by a vertical plate 60 and also braced by upper ribs 61 and lower ribs 62 on each side of the brace plate 60, this plate and the ribs 61 and 62 extending from the longitudinally outer face of the stop 59, to which they are welded. The upper edges of the stop, brace plate, and upper ribs are welded to the lower face of the plate member 47 so as to act as a unit therewith. A pair of bottom blocks 63, one on each side of brace plate 60, are welded to the brace plate and stop 59 at the lower edges thereof, and the bottom edge of each lower rib 62 is welded to the upper face of one of the blocks. The stop, bottom blocks, and brace plate, as shown in Figs. 3 and 6, project through the supporting plate 52, which as best shown in Fig. 2 is formed with a pair of apertures shaped to receive the bottom portions of the abutments 58, and these parts are welded to the edges of the respective apertures.

Cushioning means generally designated 64, of a commercially available type comprising a plurality of metal plates each having spaced rings or other masses of rubber extending therethrough, and separator plates disposed between the rubber-carrying plates, are positioned below the plate member 47 between the abutments 58. Such cushioning means are well known and need not be described in detail. This type of cushioning means is preferred because of its great cushioning capacity without "going solid," but other resilient means may be employed if desired. At each end of the cushioning means 64 is a follower 65 which substantially fills the space within the center sill 26 and bears against the adjacent stop 59. The free length of the cushioning means is greater than the distance between the followers so that it is held under partial compression by the abutments 58, and in fact is maintained in position by its pressure against the abutments. On the supporting plate 52 are welded two longitudinally extending wear plates 66 on which the cushioning means rests, and welded to the lower surface of the stress-distributing plate member 47 between the angle plates 48 is a longitudinally extending spacer 67 in the form of a channeled plate which engages over the top of the cushioning means 64. The elements of the cushioning means are thus prevented from any appreciable movement out of alinement by the wear plates 66, spacer 67, and the webs of the center sill channel members 27. In the plate member 47 are two apertures 68 located one over each follower 65, and the ends of the spacer 67 are correspondingly notched. This permits the followers to be engaged by suitable bars or similar tools and driven out of engagement with the abutments 58, after removal of the supporting plate 52. The cushioning means move with the followers, and by suitable use of appropriate clamps as the cushioning means and followers pass the lower edges of the abutments, they may be held in partially compressed assembly for re-insertion. The supporting plate 52, guide 67, and center sill channel members 27 prevent the plates of the cushioning means 64 from slipping out of position.

It is advantageous and simple to form the central crossbearers 25, plate member 47, and the parts carried thereby as a sub-assembly or unit before assembly in the underframe 20. The crossbearers and central plate 47a of the plate member are welded together with the angle plates 48 and top channel members 46 secured in position and the abutments 58 and spacer 67 welded to plate 47a and the Z-bar stringers 51 lap welded along the outer edges of the central plate. The center sill 26 is disposed between the angle plates 48, the cushioning means 64 inserted between the abutments 58, and the supporting plate 52 with its extensions 53 and 54 and the bottom channels 55 and 56 welded in place, either individually or after preliminary subassembly as previously described. The outer plates 47a may later be secured in place with the angle member stringers 51 welded to their lower faces, their outer edges being welded to the side sills 21 and their inner edges to the Z-bar stringer flanges adjacent the central plate 47a. The outer plates 47a may be made narrower than the full distance between the outer edges of the central plate 47a and the side sills so as to allow for variation in the nominal width of the side sill flanges, the stringer flanges bridging any gaps between the central and outer plates 47a. If desired, the plate member 47 may be of one piece and sub-assembled with the crossbearers and other parts in the same manner as above described, except that the stringers 51 are welded to its lower surface as part of the sub-assembly. While the use of a multi-part plate member 47 with only a central plate part included in the sub-assembly gives a lighter and less cumbersome unit, the relatively small crossbearer sub-assembly provided by either form is readily handled during fabrication and facilitates the application of the parts.

Two opposed pairs of lug means 69 are provided on the center sill, extending from the webs of the channel members 27 into the interior of the sill a distance less than the spacing of the abutments 58 from these channel members, and spaced apart longitudinally the same distance as the abutments, so that normally each pair of lug means is alined with one of the stops 59 transversely of the center sill and engages one of the followers 65 of the cushioning means 64. Each of the lug means 69 comprises a vertical face plate 70 having one edge welded to a channel member 27, and a plurality of horizontal ribs 71 vertically spaced along the channel member longitudinally outwardly of the face plate and welded to the member and plate. Upon relative longitudinal movement of the center sill in the underframe in either direction, the partially compressed cushioning means 64 is further compressed between abutment means 58 at one end thereof and lug means 69 at the other to cushion the impact of the force causing the movement, as buff or draft impact forces. The resistance of the cushioning means to compression by such forces increases on an upward curve, or in other words increases more rapidly than the travel resulting from the applied force, giving the cushioning means great absorptive capacity so that impacts of great magnitude can be satisfactorily cushioned. Impact forces beyond the capacity of the cushioning means are transmitted through the abutment 58 against which the cushioning means is compressed to the plate member 47, which by reason of its extent and securement to the side sills and crossbearers 25 and other parts of the underframe distributes the stresses in widespread fashion over an extended portion of the underframe, so that the unit stress at any point of the underframe is relatively low, and avoids such concentration of shocks or stresses as might result in failure of some underframe part. Such impact forces are of course transmitted by the abutment 58 not only to the plate member 47 but also to the crossbearers 25 through the angle plates 48 and supporting plate 52 which extend between and connect the crossbearers. The structure at the central portion of the underframe below the stress-distributing plate member 47, therefore also distributes the center sill impact stresses to the underframe over an extended portion thereof, or more exactly at widely spaced points, specifically the connections between the crossbearers and the side sills and side sill reinforcements 80. Such connections of course are strong points of the underframe and are adapted to withstand the strains imposed thereon. Thus, the structure at the center of the underframe comprising the plate member 47, crossbearers 25, angle plates 48, and supporting plate 52, or in other words the subassembly or unit described above, while a part of the underframe, is also in a sense a construction disposed between the center sill and the remainder of the underframe for directly receiving the impacts resulting from relative movements of the center sill and distributing the impact stresses so as to avoid any impact concentration at one spot in the underframe. This dispersion or deconcentration of stresses lengthens the life of the underframe not only by minimizing shocks thereto from draft or buff forces but also by preventing or lessening blows due to shifting of the lading as a result of such forces, and of course also results in less damage to the lading.

It is to be noted that no stop means is provided to limit the relative longitudinal movement of the center sill and the remainder of the underframe, so that the cushioning means provides the sole impact-transmitting engagement between the center sill and the remainder of the underframe. Full advantage is thus taken of the absorptive capacity of the cushioning means, and the underframe is not subjected to blows which otherwise would occur upon movement of the center sill against movement-limiting stop means.

Each of the intermediate crossbearers 24 comprises a diaphragm formed by a pair of spaced webs 73 each extending from a side sill to adjacent the crossbearer center, the upper edge of each being offset downwardly or depressed at its central portion, as best shown in Fig. 9. A top cover plate 74 extending from side sill to side sill welded to and following the contour of the upper web edges connects the webs and bridges the space between their inner ends. The outer ends of the top plate are bent downwardly and welded to the outer end edges of the webs to form flanges thereon. Over the raised central portion of the top cover plate 74 spanning the gap between the webs is a reinforcing channel member 75, disposed in inverted position with its flanges welded to the cover plate. A bottom cover plate 76 is welded to the bottom edge of each of the webs 73, extending from the outer to the inner end and having a vertical extension welded along the inner end edge and to the lower face of the top plate 74. Across the gap between the inner ends of the webs, welded to the lower surfaces of the bottom plates 76, extends a tie plate 77 to the bottom surface of which are welded the edges of the flanges of a channel member 78 which strengthens the crossbearer to support the center sill 26 and resist stresses imposed on the underframe. The top and bottom channel members 75 and 78 resist distortion of the opening in the crossbearer 24 in the same way as the channel members 46 and 55 of the central crossbearers 25. On the upper face of tie plate 77 are secured wear plates 79 on which the lower flanges of the center sill channel members 27 bear for sliding movement. The side sills 21 are secured to the top cover plates of crossbearers 24 substantially as in the case of the end angle members 50 of crossbearers 25. A side sill reinforcement 80 in the form of a suitable angle member with one flange vertical and the other generally parallel to the bottom plates of the crossbearers extends just below each side sill from one of the intermediate crossbears to the other, its vertical flange being riveted to the end flanges of the crossbearers 24 and 25 provided respectively by the downwardly bent portions of the top plates 74 and by vertical portions of angle members 50. Between each central crossbearer 25 and the intermediate crossbearer 24 adjacent thereto extend friction slides 81 of wood or similar material disposed to bear on the upper flanges of the center sill channel members 27. The upper surfaces of these slides 81 are substantially flush with the plate member 47 and the upper faces of the channel members 75, and their ends are bolted to suitable clips or connections 82, such as angle members, welded to the crossbearers at any convenient portions thereof, to secure the friction slides in place. The slides have a braking effect on sliding movements of the center sill to augment the cushioning or shock absorption by the cushioning means 64, and also provide support for the car floor in addition to the stringers hereafter described.

Each bolster 23, as best shown in Figs. 4, 5, and 11, comprises a pair of diaphragms each provided by a pair of webs 83 extending outwardly from the planes of the cushion gear sills or angle plates 48 to the side sills, the inner ends of the webs being spaced apart the same distance as the crossbearer webs. The upper edges of the diaphragms lie in a horizontal plane just below the side sills, except for cut-outs or downward offsets at the central and end portions. A top cover plate 84 extends over both diaphragms from side sill to side sill with its ends lying under the side sills, which are riveted thereto as shown, the plate of course being welded to the upper edges of the diaphragms and spanning the gap between the inner ends of the webs. A pair of bottom cover plates 85 are welded to the lower edges of the diaphragms, each extending from the outer ends of the webs on one side of the bolster to the inner ends. At each end of the bolster is a side sill reinforcement 86 in the form of an angle member having a vertical flange riveted to bent end portions of the diaphragms serving as flanges and a horizontal flange riveted to the bottom plate 85. A pair of channel members 87 each of which bridges the central gap in one of the diaphragms and serves as a strong reinforcing connection between the two webs 83 thereof are disposed under the top plate 84 in the central offsets of the upper diaphragm edges. Each channel member 87 has its web welded to the upper edges of the diaphragm webs which it connects, and its flanges welded to the lower surface of the top plate 84. Below the channel members 87, extending transversely of the bolster in the planes of the angle plates 48 is a pair of guide plates 88, each welded to the channel members and to the inner ends of the diaphragm webs and bottom plate at one side of the bolster center, its upper edge being cut away to accommodate the channel members. The center sill is received between the guide plates 88 and below the channel members 87. A heavy sole plate 89 welded to the lower surfaces of the bottom plates 85 extending longitudinally of the bolster, or transversely of the underframe, bridges the space between the diaphragm webs, and like the channel members 87 at the top of the bolster provides a strong connection between the two side portions of the bolster 23. The sole plate, channel members, and guide plates define an opening in the bolster through which the center sill 26 extends for sliding movement. The channel members 87 and sole plate 89 resist distortion of the opening by vertical shear forces. The sole plate has an aperture at its center registering with the aperture of a body center plate 80 welded to its lower surface, through which a center or king pin (not shown) may extend, and for which a housing or socket is provided in the bolster between the channel members 27 of the center sill. The socket is formed by a pair of socket side plates 91 parallel to the guide plates 88 and spaced inwardly therefrom sufficiently to permit the channel members 27 and reinforcements 33 at this portion to extend therebetween, the side plates 91 thus also serving as guide plates supplementary to the guide plates 88. One socket plate 92 of a pair is welded to each of the socket side plates and has a portion extending diagonally adjacent the sole plate aperture and parallel to the other plate 92, and another pair of socket plates 93 similar to the plates 92 but having diagonal portions extending in the opposite direction is similarly welded to the side plates. Each of the socket plates 92 has its inner end abutting and welded to one of the plates 93, and has the end of the other plate 93 abutting against and welded to it, so that a hollow column is provided above the king pin aperture which serves as the socket receiving the king pin. The upper portions of the inner ends of the socket plates are cut away as shown to permit access to the socket. The upper and lower edges of the socket plates 92 and 93 are welded to the channel members 87 and sole plate 89. The socket side plates 91 divide the bolster opening into three small apertures to reduce the bending movements arising from vertical shear.

Floor stringers 94, of common Z-bar form, extend from each bolster 23 to the adjacent central cross-bearer 25, over the depressed portions of the intermediate crossbearer 24 disposed therebetween. The upper surfaces of the stringers are flush with the plate member 47 and the bolster top plates 84, their ends being offset under and welded to the plate member and top plates, and their central portions being welded to the top plates 74 of the intermediate crossbearers. Six stringers 94 are employed, three on each side of the underframe. One or more of the stringers 51 on the lower surface of the plate member 47 may be alined longitudinally with certain of the stringers 94, if desired. Friction slides 95 similar to and alined with the friction slides 81 extend between each intermediate crossbearer 24 and the adjacent bolster 23, with their lower surfaces engaging the upper surfaces of the center sill channel members and their upper surfaces flush with the bolster top plates 84 and the webs of the channel members 75. The slides 95 are secured by connections 82 at their ends welded to the bolsters and crossbearers 24. Suitable body side bearings 96 are mounted depending from the bottom plates 85 of the bolsters, reinforced by stiffeners 97 of any desired construction.

Between each bolster and the adjacent end sill 22 is arranged a pair of tie bars 98, one on each side of the center sill and parallel thereto. Each tie bar is an angle member with a horizontal flange disposed not above the level of the end sill and bolster top plate and a vertical flange depending from the laterally inner edge of the horizontal flange just outwardly of the adjacent channel member 27 and in the plane of the corresponding guide plate 88. At its longitudinally inner end, the tier bar has its horizontal flange welded to the bolster top plate 84 and its vertical flange welded to the upper edge of a triangular gusset 99 the vertical edge of which is welded to the longitudinally outer edge of the guide plate 88. At its outer end, the tie bar 98 is welded by its vertical flange to the laterally outer face of a guide block 100 welded to the lower surface of end sill 22 and projecting longitudinally inwardly thereof. As best seen in Figs. 5 and 13, the guide block is located with its laterally inner face engaging the side of the pocket cover 30 and its lower face engaging the upper surface of the adjacent channel member 27. The lower inner edges of the blocks 100 are chamfered so as to clear any weld deposits at the connections of the covers 30 with the channel members 27. In sliding movement of the center sill 26, its ends are thus guided and maintained against deflection by the blocks, with the upper surfaces of the draft gear pocket covers 30 spaced slightly below the end sills. It is to be noted that no support or guide is provided for the bottom portion of the center sill at either end. Prior underframes with sliding center sills have required such supports, but it has been found that with the disclosed construction the vertical reaction of the center sill is upward in both draft and buff, so that the guide blocks 100 on the end sills 22 are sufficient for guiding the center sill ends, and the use of bottom end supports for the center sill is unnecessary. Friction slides 101 similar to the previously described slides 81 and 95 and longitudinally alined therewith are provided at the ends of the underframe, each extending between the bolster 23 and the inner end of a guide block 100. Each slide 101 is bolted or otherwise suitably secured to the vertical flange of the adjacent tie bar 98, in position to engage frictionally against the side of the pocket cover and center sill channel member flange, with its upper face flush with the horizontal flange of the end sill and the bolster top plate. Each friction slide is chamfered similarly to the metal guide block which it abuts.

A plurality of floor stringers 102, in this case two on each side of the center sill, extend between each bolster 23 and the adjacent end sill. The stringers 102 are similar to the stringers 94, being in the form of Z-bars arranged with one flange uppermost and horizontal and flush with the bolster top plate 84 and the end sill horizontal flange, the ends being offset downwardly to extend under the top plate and end sill and welded thereto.

The floor of the car, which is not shown in the drawings but which may be of any usual type such as the planks commonly used, is laid over and supported on the stress-distributing plate 47, stringers 94 and 102, top plates 84, friction slides 81, 95, and 101, and the inwardly directed horizontal flanges of the side and end sills. As made clear by the foregoing description, these floor-supporting members have their upper surfaces in the same horizontal plane. Any desired means, such as suitable floor clips, may be used to secure the floor in place. The sides and ends of the car, and the roof if one is provided, may similarly be of any desired construction.

The construction of the underframe as described provides a very strong structure and one which withstands tremendous center sill impacts without appreciable damage because of the cushioned sliding center sill and the stress distribution effected by the central frame structure, as already explained. Damage to lading is also very largely eliminated because of the minimization of shocks due to sudden acceleration and deceleration of the car and its load, or if the invention be applied to a passenger car, safety and comfort are increased. In addition to its strengthening effects on the underframe and minimization of stresses it transmits from the center sill, the stress-distributing plate member reinforces the car floor at the center of the car, which in freight cars and particularly house cars is the floor portion subjected to the greatest strains and destructive forces because the car doors are located at the center of the car, and all lading must pass over the central part of the floor in loading and unloading. The forces to which the center of the floor is subjected are especially great when mechanical lift trucks are, as is the common practice, used to load and unload the car, for such trucks impose on the floor not only their own considerable weight but the great weight of the loads they are able to move. The provision of the plate member 47 directly under the center of the floor results in such support and reinforcement thereof as substantially to prevent failure and wearing out of the central floor portion before the end portions.

It will be appreciated that the effectiveness of the cushioning arrangement is such that the underframe does not require central longitudinal means rigidly connected to the bolsters, crossbearers, and end sills, such as the common fixed center sill or a corresponding structure in which a sliding center sill is guidedly mounted. It is sufficient in the present construction to form the underframe without central longitudinal frame means, except for the angle plates 48 and supporting plate 52 connecting the central crossbearers 25.

Another embodiment of the invention is illustrated in Figs. 16 and 17, which show an underframe 105 substantially the same as the underframe 20 except for the structure at the central portion thereof. The parts which are substantially the same in both forms are therefore designated by the same reference numerals, as for example the side sills 21, bolsters 23, intermediate crossbearers 24, and center sill 26. Instead of the central crossbearers 25 of the first-described embodiment, the underframe 105 is provided with a pair of central crossbearers 106 each having a diaphragm formed of two webs 107 each extending from one end of the crossbearer to its open center. The central portions of the upper web edges are depressed, as in the case of the intermediate crossbearers 24, with the outer ends slightly below the side sills 21 and the inner ends below the level of the outer ends. A reinforcing channel member 108 connects the webs of each crossbearer, extending across the space between the webs with its web welded to the upper edges of the crossbearer webs 107 adjacent their inner ends and its flanges extending upwardly to the horizontal plane of the outer web ends. Over the webs and channel members extend top cover plates 109 welded to the flanges of the channel members 108, which flanges are cut away in alinement with the upper edges of the webs 107, and to the upper web edges, and extend the full length of the crossbearers with integral depending end flanges welded to the web end edges as in the intermediate crossbearers 24. The side sills 21 and side sill reinforcements 80 are riveted to the end flanges of the crossbearers 24 and 106 in the same way as in the underframe 20. Bottom cover plates 110 welded to the lower edges of the crossbearer webs 107 extend from the end flanges of the top cover plates 109 to adjacent the inner web ends. A horizontal cover plate 111 extends from one central crossbearer to the other in the plane of and welded to the raised central portions of the top plates 109. The angle plates 48 are disposed below the cover plate 111 with their upper edges welded thereto except at the ends, which are cut away to accommodate channel members 108, and their vertical portions welded to the inner ends of the webs 107. The horizontal flanges of the angle plates are welded to the lower edges of the webs and to the ends of the bottom cover plates 110. The supporting plate 52 with its lateral extensions 53 and 54 and wear plates 57 and 66, and the bottom channel members 55 and 56, are secured under the bottom plates and angle plate flanges as described in connection with the underframe 20. The abutment means 58 are secured depending from the cover plate 111 in the same manner as from the stress-distributing plate member 47, and are connected at their bottom portions to the supporting plate 52 as previously described. The spacer 67 is welded to the under surface of plate 111 as with the plate member 47. The resilient means 64 are held compressed between the abutments 58 as in the embodiment first described, with the lug means 69 of the center sill 26 disposed in engagement with the opposite ends thereof.

A generally X-shaped truss plate member 112 having four arms extending from its center is disposed between the crossbearers 106 at substantially the level of the depressed sections of the top plates thereof, extending the full width of the underframe but divided at the center for accommodation of the pocket in which the cushioning means are disposed. The truss plate member is provided by two generally V-shaped plate sections 113 each having a portion extending longitudinally along and welded to the outer face of one of the angle plates 48 and a pair of arms 114 diverging outwardly from the central part of the longitudinal portion. Although each section 113 may be formed of a single piece of material, it is preferable in order to minimize expense and waste to make it of a plurality of suitably shaped sheets or plates welded together, as for example of three pieces two of which form the arms 114 and are welded to the third or longitudinal portion along a single line, as shown in Fig. 16. Each of the arms 114 of the plate member 112 extends at an angle from the cushioning means pocket to the adjacent side sill reinforcement 80 and has its end edge welded thereto, the outer end portion of the arm projecting through a suitable slot 115 formed in the crossbearer web 107 and being welded thereto adjacent the slot. The arms 114 are of sufficient width to provide the desired strength and give end edges of considerable extent resulting in long lines of weld with the reinforcements 80 for strong connections therebetween. These end edges are indented to accommodate the vertical end flanges of the crossbearers. The truss plate member 112 acts in much the same manner as the stress-distributing plate member 47, transmitting the reactive stresses of center sill impact forces to widespread portions of the underframe, aside from the center sill 26. As in the case of the central portion of the underframe 20, the central structure of the underframe 105, comprising the crossbearers 106, cover plate 111, angle plates 48, and supporting plate 52, acts with the truss member 112 in distributing the stresses resulting from center sill impacts to the remainder of the underframe over an extended portion thereof.

It will be obvious that if desired the truss plate member 112 may be disposed similarly to the plate member 47, extending over the cushioning means and center sill and having the cover plate 111 incorporated therein as its central portion. It is advantageous, however, to provide the crossbearers 106 and arrange the plate member 112 as shown, for floor stringers 116 may be employed which extend continuously from one bolster 23 to the other, instead of the longitudinally divided stringers 94 and the intermediate stringers 51 on the lower face of plate member 47. The stringers 116 are of the usual Z-bar form, supported on and welded to the depressed portions of the top plates of the crossbearers 24 and 106 and the truss plate member 112, their ends being offset to extend under and be welded to the top plates of the bolsters. In the present instance six stringers are employed, three at each side of the underframe, although the number may be varied if desired. The two innermost stringers 116 may conveniently have their lower flanges overlying the lines of weld between the parts of the respective truss plate sections 113 and welded to the adjacent parts, so as to reinforce the connection therebetween. This also allows for variations due to manufacturing tolerances of the side sills, the stringers bridging any gaps between arms 114 and the longitudinal portions of the plate member 112 and serving as butt straps or tie plates, substantially as in the case of the plate member 47 employed in underframe 20. The use of such continuous stringers saves time and expense in handling and applying the same, since they need only be placed in position and welded, each being handled as a single unit and replacing two or three required by the construction employed in the first embodiment.

It should be pointed out that the cross-bearers 106 may be fabricated as a pre-assembled unit with the cover plate 111, abutments 58, and part or all of the truss plate member 112, substantially in the same way as described in connection with the unitary sub-assembly of crossbearers 25, plate member 47, and their associated parts, and the resulting sub-assembly incorporated in the underframe 105 in a single operation. The supporting plate 52 and channel members 55 and 56 are applied in the manner explained after the sub-assembly and center sill have been properly disposed relative to each other and the cushioning means inserted between the abutments 58. Thus in the second-described embodiment as well as in the first, the advantages arising from such preliminary sub-assembly are obtained regardless of the specific differences in the structures. In the sub-assembly of crossbearers 106 and plate member 112, however, several variations are possible in applying the parts of the truss plate member. Thus, the longitudinal portion of each section 113 may be welded to the adjacent angle plate 48 as part of the unit, and the arms 114 later secured in place, or these longitudinal portions and the arms 114 may be omitted from the sub-assembly and later secured in place together or separately, or the entire truss plate member 112 may be included in the sub-assembly, or other ways of assembling the plate member 112 with the crossbearers 106 and other parts may be used, as may be most advantageous under different conditions of manufacture.

What is claimed is:

1. In a railway car cushion underframe comprising a pair of body bolsters, crossbearers intermediate the bolsters, side sills secured on the ends of the bolsters and crossbearers, end sills connecting the side sills, a center sill longitudinally slidable in the bolsters and crossbearers, resilient means arranged between the center sill and the remainder of the underframe to cushion center sill impacts, opposed abutment means mounted on a portion of the remainder of the underframe spaced apart longitudinally a distance less than the free length of the resilient means and having the resilient means disposed therebetween under partial compression, and opposed lug means on the center sill spaced apart similarly to the abutment means and engaging the opposite ends of the resilient means for further compression thereof between lug means at one end and abutment means at the other end upon movement of the center sill in one direction or the other, the improvement which comprises a plate member extending between and connected to the side sills and also extending between and connected to said crossbearers, the plate member having said abutment means fixed relative thereto and the abutment means and lug means with the resilient means constituting the only means for engagement between the center sill and the plate member, the plate member distributing to the remainder of the underframe over an extended portion thereof longitudinal impact forces on the center sill, whereby underframe stresses arising from such forces are minimized.

2. In a railway car cushion underframe comprising a pair of body bolsters, crossbearers intermediate the bolsters, side sills secured on the ends of the bolsters and crossbearers, end sills connecting the side sills, a center sill longitudinally slidable in the bolsters and crossbearers, resilient means arranged between the center sill and the remainder of the underframe to cushion center sill impacts, opposed abutment means mounted on a portion of the remainder of the underframe spaced apart longitudinally a distance less than the free length of the resilient means and having the resilient means disposed therebetween under partial compression, and opposed lug means on the center sill spaced apart similarly to the abutment means and engaging the opposite ends of the resilient means for further compression therebetween lug means at one end and abutment means at the other end upon longitudinal movement of the center sill relative to the remainder of the underframe, the resilient means constituting the sole means for longitudinal impact-transmitting engagement between the center sill and the remainder of the underframe.

3. In a railway car cushion underframe comprising a pair of body bolsters, crossbearers intermediate the bolsters, side sills secured on the ends of the bolsters and crossbearers, end sills connecting the side sills, a center sill longitudinally slidable in the bolsters and crossbearers, and cushioning means arranged between the center sill and the remainder of the underframe to cushion center sill impacts including resilient means, fixed means longitudinally spaced apart mounted on a portion of the remainder of the underframe and holding the resilient means under partial compression therebetween, and spaced rigid means on the center sill engageable with the ends of the resilient means for further compression thereof between rigid means at one end and fixed means at the other end upon relative center sill movement in one direction or the other, the improvement which comprises a thrust distributing member extending between and connected to the side sills and also extending between and connected to said crossbearers and comprising said underframe portion mounting the fixed means, said cushioning means constituting the sole means of engagement between the center sill and the distributing member, the distributing member transmitting to the remainder of the underframe over an extended portion thereof longitudinal impact forces on the center sill and minimizing underframe stresses arising from such forces.

4. A railway car cushion underframe comprising a pair of body bolsters, cross members intermediate the bolsters, side sills secured on the ends of the bolsters and cross members, end sills connecting the side sills, a center sill longitudinally slidable in the bolsters and cross members, a thrust distributing member extending between and connected to the side sills and also extending between and connected to said cross members, rigid abutment means on the distributing member spaced apart longitudinally of the underframe, resilient means held partially compressed between said abutment means, and lug means on the center sill spaced similarly to the abutment means normally disposed engaging the opposite ends of the resilient means for further compression thereof between lug means at one end and abutment means at the other end upon longitudinal movement of the center sill relative to the distributing member, whereby longitudinal center sill forces are at least partially absorbed by the resilient means and spread over an extended portion of the remainder of the underframe by the thrust distributing member to minimize stresses arising from such forces.

5. In a railway car cushion underframe comprising a pair of body bolsters, side sills secured on the bolsters, end sills connecting the side sills, a center sill slidably carried by the bolsters, resilient means arranged between the center sill and the remainder of the underframe to cushion the transmission of impacts therebetween, and longitudinally spaced lug means on the center sill for compressing engagement with the resilient means upon relative movement of the center sill in one or the other longitudinal direction, the improvement which comprises stress-distributing structure in the underframe including a pair of spaced crossbearers slidably receiving the center sill therethrough disposed between the bolsters and connected to the side sills, a stress member extending between and connected to the crossbearers and also extending between and connected to the side sills, and opposed abutment means carried by the stress member longitudinally spaced a distance less than the free length of the resilient means and carrying the resilient means under partial compression therebetween with the opposite ends thereof in engagement with said spaced lug means of the center sill, said structure constituting means for receiving center sill impact forces and distributing such forces over an extended portion of the remainder of the underframe to minimize the resulting stresses thereon.

6. In a railway car cushion underframe comprising a pair of body bolsters, side sills secured on the bolsters, end sills connecting the side sills, a center sill slidably carried by the bolsters, resilient means arranged between the center sill and the remainder of the underframe to cushion the transmission of impacts therebetween, and longitudinally spaced lug means on the center sill for compressing engagement with the resilient means upon movement of the center sill in one or the other longitudinal direction, the improvement which comprises stress-distributing structure in the underframe including a pair of spaced crossbearers slidably receiving the center sill therethrough disposed between the bolsters and connected to the side sills, a stress member extending between and connected to the crossbearers and also extending between and connected to the side sills, connection means carried by the stress member extending longitudinally between and rigidly connecting the crossbearers, and opposed abutment means disposed between the crossbearers fixed relative to the stress member spaced apart longitudinally and carrying the resilient means under partial compression therebetween with the opposite ends thereof in engagement with said spaced lug means of the center sill for further compression between lug means at one end and abutment means at the other end upon relative longitudinal movement of the center sill, said structure constituting means for transmitting to the remainder of the underframe over an extended portion thereof center sill impact forces to avoid concentration on the underframe of stresses resulting from such forces.

7. In a railway car cushion underframe comprising a pair of body bolsters, side sills secured on the bolsters, end sills connecting the side sills, a center sill extending through and slidable longitudinally in the bolsters, resilient means arranged between the center sill and the remainder of the underframe to cushion the transmission of impacts on the center sill to the underframe, opposed abutments on the remainder of the underframe carrying the resilient means therebetween, and longitudinally spaced lug means on the center sill for compressing engagement with the resilient means upon relative longitudinal movement of the center sill, the resilient means constituting the sole means for longitudinal impact-transmitting engagement between the center sill and the remainder of the underframe.

8. In a railway car cushion underframe comprising a pair of body bolsters, side sills secured on the bolsters, end sills connecting the side sills, a center sill slidably carried by the bolsters, resilient means arranged between the center sill and the remainder of the underframe to cushion the transmission of impacts therebetween, and longitudinally spaced lug means on the center sill for compressing engagement with the resilient means upon relative movement of the center sill in either longitudinal direction, the improvement which comprises a unitary assembly disposed in the underframe between the bolsters and including a pair of spaced crossbearers slidably receiving the center sill therethrough and connected to the side sills, horizontal truss plate means in the plane of the center sill extending on both sides thereof in unsecured relation thereto lying between and connected to the crossbearers and also lying between and secured to the side sills, and opposed abutment means fixed relative to the truss plate means spaced apart longitudinally and carrying the resilient means under partial compression therebetween with the opposite ends thereof in engagement with said spaced lug means of the center sill for further compression between lug means at one end and abutment means at the other end upon longitudinal movement of the center sill, whereby center sill impacts are at least partially absorbed by the resilient means and distributed by the truss plate means over an extended portion of the underframe to avoid concentration of the resulting stresses thereon.

9. In a railway car cushion underframe comprising a pair of body bolsters, crossbearers intermediate the bolsters, side sills secured on the ends of the bolsters and crossbearers, end sills connecting the side sills, a center sill slidably carried by the bolsters and crossbearers, and resilient means arranged between the center sill and the remainder of the underframe for cushioning forces causing relative longitudinal movement of the center sill in the underframe, the improvement which comprises a force distributing plate above the center sill extending between and secured to said crossbrearers and also extending between and connected to the side sills, spaced opposed abutment means fixed on the plate depending into the plane of the center sill and having the resilient means partially compressed therebetween, and opposed lug means fixed on the center sill spaced longitudinally thereof in correspondence with the spacing of the abutment means and disposed for engagement with opposite ends of the resilient means to further compress the resilient means between lug means at one end and abutment means at the other end upon relative longitudinal movement of the center sill, the abutment means and lug means with the resilient means constituting the sole means for impact-transmitting engagement between the center sill and the plate, whereby impacts on the center sill are at least partially absorbed by the resilient means and distributed over a widespread area of the underframe by the plate.

10. In a railway car cushion underframe comprising a plurality of cross members, side sills secured on the ends of the cross members, end sills connecting the side sills, a center sill slidably carried by the cross members, and cushioning means operatively arranged between the center sill and the remainder of the underframe for cushioning forces causing relative longitudinal movement of the center sill in the underframe, the cushioning means constituting the sole means for longitudinal impact-transmitting engagement between the center sill and the remainder of the underframe.

11. In a railway car cushion underframe comprising a pair of body bolsters, crossbearers intermediate the bolsters, side sills secured on the ends of the bolsters and crossbearers, end sills connecting the side sills, a longitudinally slidable center sill carried by the bolsters and crossbearers, and resilient means arranged between the center sill and the remainder of the underframe to cushion relative movement thereof under center sill impacts, the improvement which comprises a plate disposed at the central portion of the underframe extending over and forming the top cover plates of said crossbearers and connected to the side sills, longitudinally spaced abutment means on the plate extending into the plane of the center sill and carrying the resilient means therebetween under partial compression, and longitudinally spaced lug means on the center sill disposed for engagement with opposite ends of the resilient means for further compression thereof between lug means at one end and abutment means at the other end upon relative longitudinal movement of the sill, said abutments means and lug means with the resilient means constituting the sole means for impact-transmitting engagement between the center sill and the plate, the resilient means at least partially absorbing impacts on the center sill and the plate distributing the impact forces to the remainder of the underframe over a relatively wide area.

12. In a railway car cushion underframe comprising a pair of body bolsters, crossbearers intermediate the bolsters, side sills secured on the ends of the bolsters and crossbearers, end sills connecting the side sills, a longitudinally slidable center sill carried by the bolsters and crossbearers, and cushioning means operatively arranged between the center sill and the remainder of the underframe to cushion relative movement thereof under center sill impacts, the cushioning means constituting the sole means for impact-transmitting engagement between the center sill and the remainder of the underframe.

13. In a railway car cushion underframe comprising a pair of body bolsters, crossbearers intermediate the bolsters, side sills secured on the ends of the bolsters and crossbearers, end sills connecting the side sills, a center sill slidably carried by the bolsters and crossbearers, and resilient means arranged between the center sill and the remainder of the underframe to cushion relative movement thereof under center sill impacts, the improvement which comprises a floor-reinforcing plate disposed at the central portion of the underframe extending over and secured to said cross bearers and also extending between and connected to the side sills, opposed abutment means on the plate extending adjacent the center sill longitudinally spaced apart a distance less than the free length of said resilient means and having the resilient means disposed under partial compression therebetween, and opposed lug means on the center sill longitudinally spaced a distance corresponding to the spacing of said abutment means and disposed in engagement with the ends of the resilient means for further compression thereof upon relative movement of the center sill in either direction, the abutment means and lug means with said resilient means constituting the only means of engagement between the center sill and the plate for impact transmission therebetween, and the plate reinforcing the car floor at the area of greatest strains thereon and distributing over an extended portion of the underframe center sill impact forces.

14. In a railway car cushion underframe comprising a pair of body bolsters, crossbearers intermediate the bolsters, side sills secured on the ends of the bolsters and crossbearers, end sills connecting the side sills, a center sill slidably carried by the bolsters and crossbearers, and resilient means arranged between the center sill and the remainder of the underframe to cushion relative movement thereof under center sill impacts, the improvement which comprises a floor-reinforcing plate disposed at the central portion of the underframe extending over and secured to said crossbearers and also extending between and connected to the side sills, opposed abutment means on the plate extending adjacent the center sill longitudinally spaced apart a distance less than the free length of said resilient means and having the resilient means disposed under partial compression therebetween, and opposed lug means on the center sill longitudinally spaced a distance corresponding to the spacing of said abutment means and disposed in engagement with the ends of the resilient means for further compression thereof upon relative movement of the center sill in either direction, the plate reinforcingly supporting the car floor at the area of greatest strains thereon and distributing over an extended portion of the underframe center sill impact forces.

15. In a railway car cushion underframe comprising a pair of body bolsters, crossbearers intermediate the bolsters, side sills secured on the ends of the bolsters and crossbearers, end sills connecting the side sills, a center sill extending through and slidable in the bolsters and cross bearers, and resilient means arranged between the center sill and the remainder of the underframe to cushion relative movement thereof under impact on the center sill, the improvement which comprises a truss plate between said crossbearers having a plurality of arms each extending at an angle from adjacent the connection of a side sill and crossbearer to adjacent the center sill, opposed abutment means carried by the truss plate adjacent the center sill longitudinally spaced apart less than the free length of the resilient means and having the resilient means disposed therebetween under partial compression, and opposed lug means on the center sill longitudinally spaced in correspondence with the abutment means and disposed for engagement with the opposite ends of the resilient means for further compression thereof upon movement of the center sill longitudinally in either direction, the abutment means and lug means with the resilient means constituting the only means for impact-transmitting engagement between the center sill and the truss plate, whereby impact forces on the center sill are at least partially absorbed by the resilient means and transmitted to widely separated portions of the remainder of the underframe by the truss plate and stresses on the underframe greatly minimized.

16. In a railway car cushion underframe comprising a pair of body bolsters, crossbearers intermediate the bolsters, side sills secured on the ends of the bolsters and crossbearers, end sills connecting the side sills, a center sill extending through and slidable in the bolsters and crossbearers, and resilient means arranged between the center sill and the remainder of the underframe to cushion relative movement thereof under impact on the center sill, the improvement which comprises a truss plate between said cross bearers having a plurality of arms each extending at an angle from adjacent the connection of a side sill and crossbearer to adjacent the center sill, opposed abutment means carried by the plate adjacent the center sill longitudinally spaced apart less than the free length of the resilient means and having the resilient means disposed therebetween under partial compression, and opposed lug means on the center sill longitudinally spaced in correspondence with the abutment means and disposed for engagement with the opposite ends of the resilient means for further compression thereof upon movement of the center sill longitudinally in either direction, whereby impact forces on the center sill are at least partially absorbed by the resilient means and transmitted to widely separated portions of the remainder of the underframe by the truss plate and stresses on the underframe greatly minimized.

17. In a railway car cushion underframe comprising a pair of body bolsters, a pair of crossbearers intermediate the bolsters, side sills secured on the ends of the bolsters and crossbearers, end sills connecting the side sills, a center sill slidable in the bolsters and crossbearers, and resilient means arranged between the center sill and the remainder of the underframe to cushion impacts on the center sill, the improvement which comprises a truss member disposed substantially in the horizontal plane of the center sill within a rectangle defined by said crossbearers and the side sills having arms extending from the central portion of the truss member to the corners of the rectangle and secured thereat, means at the central portion spanning the center sill, longitudinally spaced opposed abutment means on the spanning means having said resilient means disposed therebetween under partial compression, and opposed lug means on the center sill disposed in engagement with the opposite ends of the resilient means for further compression thereof upon longitudinal movement of the center sill in either direction, the abutment means and lug means with the resilient means constituting the sole means for impact-transmitting engagement between the center sill and the truss member, whereby impact forces on the center sill are transmitted to the remainder of the underframe at a plurality of spaced areas by the truss member under compression and tension to minimize stresses on the underframe.

18. In a railway car cushion underframe comprising a pair of body bolsters, a pair of crossbearers intermediate the bolsters, side sills secured on the ends of the bolsters and crossbearers, end sills connecting the side sills, a center sill slidable in the bolsters and crossbearers, and resilient means arranged between the center sill and the remainder of the underframe to cushion impacts on the center sill, the improvement which comprises a truss member disposed substantially in the horizontal plane of the center sill within a rectangle defined by said crossbearers and the side sills having arms extending from the central portion to the corners of the rectangle and secured thereat, means at the central portion of the truss member spanning the center sill, longitudinally spaced opposed abutment means on the spanning means having said resilient means disposed therebetween under partial compression, and opposed lug means on the center sill disposed in engagement with the opposite ends of the resilient means for further compression thereof upon longitudinal movement of the center sill in either direction, whereby impact forces on the center sill are transmitted by the truss member to the remainder of the underframe under compression and tension at a plurality of spaced areas to minimize stresses thereon.

19. In a railway car cushion underframe comprising a pair of body bolsters, side sills secured on the bolsters, end sills connecting the side sills, a center sill slidably carried by the bolsters, resilient means arranged between the center sill and the remainder of the underframe to cushion the transmission of impacts therebetween, and longitudinally spaced lug means on the center sill for compressing engagement with the resilient means upon relative movement of the center sill in either longitudinal direction, the improvement which comprises stress-distributing structure in the underframe including a pair of spaced crossbearers slidably receiving the center sill therethrough disposed between the bolsters and connected to the side sills, a stress member extending between and connected to the crossbearers and also extending between and connected to the side sills, and opposed abutment means carried by the stress member longitudinally spaced a distance less than the free length of the resilient means and carrying the resilient means under partial compression therebetween with the opposite ends thereof in engagement with said spaced lug means of the center sill, said structure constituting means for receiving center sill impact forces exceeding the capacity of the resilient means and distributing such forces over an extended portion of the remainder of the underframe to minimize the resulting stresses thereon, said stress member comprising a plurality of plate portions arranged between the side sills having adjacent edges extending longitudinally of the underframe connected together, a longitudinal member being connected to said crossbearers and having a horizontal portion secured to adjacent plate portions at the adjacent edges thereof and bridging the joint therebetween to allow variation in spacing of said edges in accordance with variation in the distance between the side sills.

20. A railway car cushion underframe comprising a plurality of cross members, side sills secured on the ends of the cross members, end sills connecting the ends of the side sills, a center sill longitudinally slidable in said cross members, resilient means arranged between the center sill and the remainder of the underframe for cushioning forces causing relative longitudinal movement of the center sill in the underframe, fixed abutment means on said remainder of the underframe adjacent the center sill longitudinally spaced apart a distance less than the free length of said resilient means and having the resilient means disposed therebetween under partial compression, and fixed lug means on the center sill spaced longitudinally in correspondence with the spacing of said abutment means and disposed for engagement with opposite ends of the resilient means to further compress the resilient means between lug means at one end and abutment means at the other upon relative longitudinal movement of the center sill, the resilient means constituting the sole means for impact-transmitting engagement between the center sill and the remainder of the underframe.

References Cited in the file of this patent

UNITED STATES PATENTS

| | | |
|---|---|---|
| 2,220,101 | Hall | Nov. 5, 1940 |
| 2,330,706 | Hankins et al. | Sept. 28, 1943 |